UNITED STATES PATENT OFFICE.

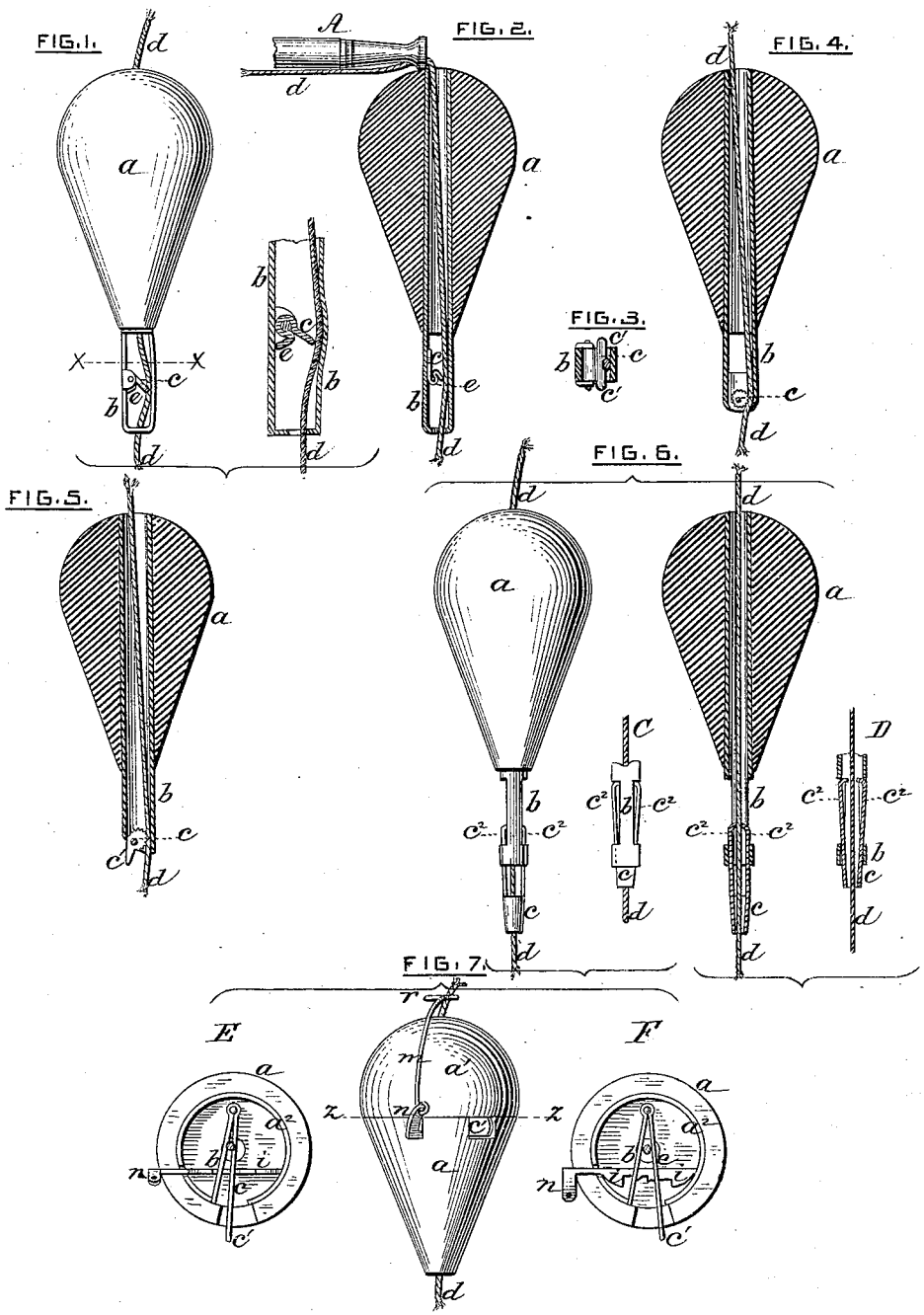

CHARLES M. SMITH, OF NEW HAVEN, CONNECTICUT.

FISHING-LINE FLOAT.

SPECIFICATION forming part of Letters Patent No. 250,848, dated December 13, 1881.

Application filed October 31, 1881. (No model.)

*To all whom it may concern:*

Be it known that I, CHARLES MONROE SMITH, a citizen of the United States, residing at New Haven, in the county of New Haven and State of Connecticut, have invented new and useful Improvements in Fishing-Line Floats, of which the following is a specification.

In angling for game fish a float is used to hold the baited hook in suspension, and it is necessary that the float-connection with the line be fixed, otherwise, in casting the line, the float would be liable to slide and to change its position upon the line so that the baited hook might be carried to the bottom or be held in a position too far from the bottom for the shy fish. By reason of the fixed position of the float upon the line it is impossible for the sportsman to reel his line beyond bringing the float to the rod, and hence he loses control of the fish after the float reaches the tip of the rod in reeling the line, and some anglers, on this account, prefer not to use the float. To dispense with the float renders the sport tiresome, especially in twenty-five or thirty feet of water, as the baited hook must at all times be held free of the bottom. With a float having a fixed connection with the line it is obvious that a good-sized game fish could not be easily controlled with the freedom of such a length of line, and much care is required to bring in the fish in his darting movements toward and from the angler, who must reel the line and let it out as required, to tire out the fish, otherwise he is liable to lose both the fish and the line.

The object of my improvement is to provide a float which, while being capable of a fixed connection with the line to suit the depth of the water and to hold it in position while casting the line, is also adapted for the automatic release or setting free of such connection upon being reeled in contact with the rod, whereby the float will instantly let go its hold upon the line and slide thereon freely down to the hook. This gives the angler full control of the line and allows the use of a float which maintains a fixed position upon the line to sustain the baited hook, and which can be set as free of the line as though it were not used, in the operation of reeling in the line and without interruption or interference with the reeling. For this purpose I provide the float with a device having a firm griping function upon the line, and which, being made effective by the angler to suit the depth of fishing, is rendered non-active in such function in reeling the line to bring the float in contact with the rod.

Referring to the accompanying drawings, Figure 1 represents an elevation of a float for lines used in angling, the float being shown as fixed to the line to sustain the baited hook, the griping device being shown enlarged in section; Fig. 2, a vertical section of the same, showing the float in the position in which it is reeled in contact with the rod and the non-fixed relation thereby produced, of the float with the line, leaving the former free to slide down to the hook in reeling home the fish; Fig. 3, a horizontal section of the line-griping device, taken on the line $x\ x$ of Fig. 1; and Figs. 4, 5, 6, and 7 represent modifications of the griping device, all having the same capacity for firmly griping the line and of being automatically released from such griping function.

The float $a$ may be of any suitable form and material, and the line-griping device may be adapted for being applied to the float in various ways, and it may also be of various forms, as shown. Of the forms of such device which I have shown that seen in Figs. 1, 2, and 3 is preferable; but it is obvious that a griping or fastening device applied to the float, so as to make a firm fastening with the line, and adapted for being automatically released of such fastening function by contact of the float with the rod will be within the scope and object of my invention. In the preferred form shown such fastening device consists of a tubular or stem part, $b$, securely fitted and fixed lengthwise in the center of the float, and, projecting a suitable distance from the lower end thereof, is open at both ends for the passage of the line. Within this projecting part $b$ a movable part, $c$, is placed in such manner and of such construction as to be turned or adjusted in position to gripe, bite, or firmly hold the line $d$ against the inner side of the fixed part. The movable part is pivoted to one side of the fixed part, and its fastening or griping function is made upon the line against the opposite side of said fixed part, which has a slight spring function, so as to yield as the movable part is turned over to gripe the line against the spring side. The movement of the turning part to make the fastening is limited by a stop, $e$, so placed as to prevent said turning part from moving past the fastening-point, as in Fig. 1. The turning part forms a straight edge, and its end or ends $c'$ extend through the open sides of the fixed stem part, (see Fig. 3,) to allow the angler to press the movable part down to fasten the float when properly set. Thus fastened to the float the pull upon the line at its hook end tends to increase the force of the gripe upon the line and in casting the latter, the float cannot move upon the line. When, however, the baited hook is taken by the fish and the line is reeled to bring the float against the end of the rod A, that moment the movement of the float is arrested, and the reeling of the line being continued it will pull with it the movable part of the fastening device and turning it back out of its griping position free and release the float, so that it will run down the line to the hook, and thus give the angler no trouble in reeling the line to bring in the fish. The weight of the float will carry it down the line at once, and its descent will tend to open and to keep open the griping part. The fish having been landed and the hook properly baited, the float is again set by the angler.

In Figs. 4 and 5 the movable griping-part $c$ is formed of an eccentric, having a roughened surface to gripe the line against the inner side of the fixed stem part. In one form of eccentric the line may be fastened against either side of the fixed stem part, and the other form has a thumb-piece, $c'$, by which it is set upon the line. The same results are obtained by the construction shown in Fig. 6, in which the movable part of the griping device is formed by a short tube, $c$, fitted to slide within the fixed stem or holder, and having its inclosed part formed of spring-jaws $c^2$, which are forced together upon the line by pulling the short tube $c$ out. As the short tube $c$ cannot be entirely drawn from the tubular holding part, the latter serves to close the spring-jaws with a biting action upon the line. The projecting part of the fixed stem $b$ is open at the sides to allow the spring-jaws when drawn in to open free of the line, and whether open or closed the jaw part cannot be drawn through the tubular holding part, but must retain its position within the fixed part. In these several plans the device occupies a longitudinal relation to the float, and its action is to clamp and to release the float by a turning or a sliding movement thereon.

In Fig. 7 the device is arranged transversely within the float, and consists of a spring gripe or clamp, formed of a movable part, $c$, and a fixed part, $b$, secured crosswise within the float, with the line passing between them through the float. The free end $c'$ of the movable part $c$ projects through an opening in the side of the float, by which it is moved toward the fixed part, and thus gripe the line to fasten the float thereon. The movable spring part is secured in its griping or fastening function by a toothed or notched catch, $i$, arranged horizontally across the float beneath the griping device, and pivoted so as to be turned up edgewise to bring its toothed edge in position to receive into its teeth the movable spring part $c$, and to hold it secure when clamped upon the line. One end of this pivoted catch extends through an opening in the side of the float, and has a short sidewise-bent end, $n$, to which an arm, $m$, is jointed and extends above the top of the float. This arm has an eye, $r$, at its upper end, through which the line passes, and this eyed end is thus held in position to strike the end of the rod as the line is reeled. When the float is set and fastened to the line the catch stands edgewise upward, and the movable part $c$ is locked thereto by the edge notches or teeth, so that the catch end $n$ stands upwardly-inclined at one side of the catch, and supports the eyed end $r$ of the arm $m$ a short distance above the top of the float, so that when the latter is brought up to the rod the arm $m$ will be struck thereby and forced down, depressing the catch end $n$ and, turning down the catch flatwise, release the float from its fixed relation to the line, and thus allow it to pass out of the way in reeling the line. In this modification the float is made of two parts, $a$ $a'$, and the griping and fastening device is set in a rimmed plate, $a^2$, and the float parts properly secured.

In Fig. 6, C and D show the float-griping device in elevation and in section as released, and in Fig. 7 E and F show horizontal sections at line $z$ $z$, in E the float being griped, and in F the float being released from the line.

I claim—

1. The combination of the float and the line with a device carried by the float and adapted to gripe, bite, or firmly hold the float to the line and to be automatically released and set free of such fastening function by contact with the rod in reeling the line.

2. The combination of the float and the line with a pivoted griping or fastening device and a holder therefor fixed in the float, the said griping device being adapted to be released and freed of the line in the arrest of the float in reeling the line, substantially as described, for the purpose specified.

In testimony whereof I have hereunto set my hand in the presence of two subscribing witnesses.

CHARLES M. SMITH.

Witnesses:
JULIUS TWISS,
EDWIN C. DOW.